United States Patent
Ito et al.

(10) Patent No.: US 7,821,656 B2
(45) Date of Patent: Oct. 26, 2010

(54) METHOD OF DRAWING IMAGES USING A DYNAMIC RECONFIGURABLE PROCESSOR, CIRCUIT THEREFOR AND IMAGE OUTPUT CONTROL APPARATUS

(75) Inventors: Nobuyasu Ito, Yokohama (JP); Tomohiro Tachikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 957 days.

(21) Appl. No.: 11/231,833

(22) Filed: Sep. 22, 2005

(65) Prior Publication Data

US 2006/0061794 A1  Mar. 23, 2006

(30) Foreign Application Priority Data

Sep. 22, 2004  (JP)  .............................. 2004-275029

(51) Int. Cl.
*G06F 3/12* (2006.01)
*G06F 9/46* (2006.01)

(52) U.S. Cl. .................. 358/1.1; 358/1.9; 358/1.15; 718/105

(58) Field of Classification Search .............. 358/1.1, 358/1.9, 1.11, 1.13, 1.15, 1.16, 1.17, 426.01, 358/426.02, 426.03, 426.04, 426.05, 426.06; 382/276, 302, 303, 304; 700/2, 3, 4, 5, 6, 700/7; 715/200, 273, 276; 345/418, 501, 345/502, 503, 504, 505, 506, 519, 522, 530, 345/531, 532, 536, 537, 538, 541, 542, 543, 345/544, 545, 549, 550, 551, 552, 553, 554, 345/555, 556, 557, 558, 559, 560, 581, 582, 345/588, 589

See application file for complete search history.

(56) References Cited

U.S. PATENT DOCUMENTS 5,768,489 A * 6/1998 Adachi et al. ............... 358/1.18

(Continued)

FOREIGN PATENT DOCUMENTS

JP  11-105371  4/1999

(Continued)

OTHER PUBLICATIONS

JPO translation of the Japanese Official Communication, dated Aug. 14, 2009, regarding application No. 2004-275029.*

(Continued)

*Primary Examiner*—King Y Poon
*Assistant Examiner*—Peter L Cheng
(74) *Attorney, Agent, or Firm*—Fitzpatrick, Cella, Harper & Scinto

(57) ABSTRACT

A drawing processing circuit includes a plurality of rasterizing means capable of executing rasterizing processes in parallel. Each rasterizing means includes a dynamic reconfigurable processor. Data described by a page description language is received, analyzed, and converted into intermediate data for each drawn object. Before execution of a rasterizing process, scheduling data of reconfiguration of the processor is generated by estimating the process time of each rasterizing process on the basis of the intermediate data. The plurality of rasterizing means rasterize the data to bitmap data on the basis of the intermediate data while reconfiguring the processor on the basis of the generated scheduling data. In addition, the process time of each of the plurality of rasterizing means is determined on the basis of the scheduling data. The scheduling data is corrected so as to make the process times of the plurality of rasterizing means substantially equal. With this arrangement, a method of drawing image, which reduces the waste of hardware resources and perform a high-speed drawing process, a circuit thereof, and a print control apparatus are provided.

5 Claims, 10 Drawing Sheets

U.S. PATENT DOCUMENTS

| | | | |
|---|---|---|---|
| 6,219,149 B1 * | 4/2001 | Kawata et al. | 358/1.15 |
| 6,323,958 B1 * | 11/2001 | Shimizu | 358/1.9 |
| 6,819,447 B1 | 11/2004 | Sawano | 358/1.16 |
| 7,075,541 B2 * | 7/2006 | Diard | 345/505 |
| 2003/0160798 A1 * | 8/2003 | Buehler | 345/581 |
| 2005/0210472 A1 * | 9/2005 | Accapadi et al. | 718/105 |

FOREIGN PATENT DOCUMENTS

| | | |
|---|---|---|
| JP | 11-144062 | 5/1999 |
| JP | 2000-351240 | 12/2000 |
| JP | 2001-10123 | 1/2001 |
| JP | 2003-241917 | 8/2003 |
| JP | 02003241917 A * | 8/2003 |

OTHER PUBLICATIONS

Japanese Official Communication, dated Aug. 14, 2009, regarding Application No. 2004-275029.

* cited by examiner

METHOD OF DRAWING IMAGES USING A DYNAMIC RECONFIGURABLE PROCESSOR, CIRCUIT THEREFOR AND IMAGE OUTPUT CONTROL APPARATUS

FIELD OF THE INVENTION

The present invention relates to a method of drawing images, a circuit therefor, and an image output control apparatus and, more particularly, to a method of drawing images in which data as a print job described by an object description language such as PDL is received from a host computer, the data of one page is segmented into a plurality of bands, each band is converted into intermediate data, and the intermediate data is rasterized to bitmap data in accordance with the attribute of a drawn object contained in the intermediate data, a circuit therefor, and an image output control apparatus.

BACKGROUND OF THE INVENTION

In this specification, an image output control apparatus will be exemplified by a print control apparatus for controlling image output to a print means for printing an image. However, the present invention can also be applied to control of image output to a display means, and an apparatus therefor is also incorporated in the present invention.

As a drawing processing technique related to the present invention, a technique disclosed in, e.g., Japanese Patent Laid-Open No. 11-105371 is generally used. In Japanese Patent Laid-Open-No. 11-105371, on the basis of intermediate data generated from print data and the attribute (e.g., whether the printer engine is color or monochrome) of an output means for printing and outputting the data, a reconfiguration control means reconfigures a rasterizing process means to rasterize the intermediate data to drawing data (bitmap data) corresponding to the specifications of the output means.

Japanese Patent Laid-Open No. 2003-241917 filed by the present applicant discloses a DL (Display List) structure suitable for reading out data of each attribute in a short time by DMA when data is rasterized to bitmap data in accordance with the attribute of each drawn object contained in intermediate data, and procedures thereof.

In reconfiguration in Japanese Patent Laid-Open No. 11-105371, a plurality of hardware resources are provided. The fixed resources are selected, or connection between them is changed such that a desired rasterizing process is executed. The configuration of the rasterizing process means is fixed during drawing of at least one object. Similarly, in Japanese Patent Laid-Open No. 2003-241917 as well, each attribute data read by DMA is rasterized by a dedicated fixed data generation unit.

Hence, even when the time of rasterizing process of each attribute changes in drawing each object, or even in an extreme case wherein an attribute without rasterizing process is present, the process time is limited by the rasterizing process of an attribute which always takes time most. A hardware resource with an attribute without any rasterizing process idles in the meantime. Hence, the hardware resource is wasted.

SUMMARY OF THE INVENTION

The present invention has been made in consideration of the above-described problems of prior arts, and has as its object to provide a method of drawing images, which is configured to reconfigure hardware resources in accordance with the attribute of output data based on an object and execute scheduling and, more particularly, dynamic scheduling of reconfiguration to reduce the waste of hardware resources and perform a high-speed drawing process, a circuit thereof, and a print control apparatus.

In order to achieve the above object, according to the present invention, there is provided a drawing processing circuit comprising: object generation means for receiving data described by a page description language and generating objects to be drawn each including plural kinds of attribute data; a plurality of rasterizing means for rasterizing the objects generated by the generation means to bitmap data, each of the plurality of rasterizing means having a dynamic reconfigurable processor to be able to execute plural kinds of rasterizing processes respectively corresponding to the plural kinds of attribute data; schedule generation means for generating, before execution of the rasterizing process, scheduling data scheduling a change of the plural kinds of rasterizing processes executed by the processor by estimating a process time which each of the plurality of rasterizing processes elapses on the basis of the attribute data to be processed by the rasterizing means; and reconfiguration means for reconfiguring the processor so as to change the plural kinds of rasterizing processes executed by the processor on the basis of the scheduling data.

The drawing processing circuit further comprises: process time determination means for determining the process time which each of the plurality of rasterizing means elapses on the basis of the scheduling data; and correction means for correcting the scheduling data so as to make times in which the plurality of rasterizing means complete the rasterizing processes substantially equal. The attributes data include data indicating an area occupied by an object to be drawn, data indicating the object, data indicating a color of the object, and data indicating a pattern of the object. The plurality of rasterizing means execute the rasterizing processes in units of segmented data obtained by segmenting page-oriented data by a predetermined amount of data.

According to the present invention, there is provided an image output control apparatus which includes a drawing processing circuit to receive data described by a page description language and rasterize the data to bitmap data, and outputs the bitmap data rasterized by the drawing processing circuit to output means, the drawing processing circuit comprises: object generation means for receiving data described by a page description language and generating objects to be drawn each including plural kinds of attribute data; a plurality of rasterizing means for rasterizing the objects generated by the generation means to bitmap data, each of the plurality of rasterizing means having a dynamic reconfigurable processor to be able to execute plural kinds of rasterizing processes respectively corresponding to the plural kinds of attribute data; schedule generation means for generating, before execution of the rasterizing process, scheduling data scheduling a change of the plural kinds of rasterizing processes executed by the processor by estimating a process time which each of the plurality of rasterizing processes elapses on the basis of the attribute data to be processed by the rasterizing means; and reconfiguration means for reconfiguring the processor so as to change the plural kinds of rasterizing processes executed by the processor on the basis of the scheduling data.

The drawing processing circuit of the image output control apparatus further comprises: process time determination means for determining the process time which each of the plurality of rasterizing means elapses on the basis of the scheduling data; and correction means for correcting the scheduling data so as to make times in which the plurality of rasterizing means complete the rasterizing processes substantially equal.

According to the present invention, there is provided a method of receiving data described by a page description language and rasterizing the data to bitmap data by a plurality of rasterizing means, each having a dynamic reconfigurable processor, capable of executing rasterizing processes in parallel, the method comprising the steps of: receiving data described by a page description language and generating objects to be drawn each including plural kinds of attribute data; generating, before execution of the rasterizing process, scheduling data scheduling a change of the plural kinds of rasterizing processes executed by the processor by estimating a process time which each of the plurality of rasterizing processes elapses on the basis of the attribute data to be processed by the rasterizing means; and rasterizing the generated objects to bitmap data with reconfiguring the processor so as to change the plural kinds of rasterizing processes executed by the processor on the basis of the scheduling data.

The method further comprises the steps of: determining the process time which each of the plurality of rasterizing means elapses on the basis of the scheduling data; and correcting the scheduling data so as to make times in which the plurality of rasterizing means complete the rasterizing processes substantially equal.

According to the present invention, there is provided a computer-executable control program which accomplishes the above mentioned method of receiving data described by a page description language and rasterizing the data to bitmap data by a plurality of rasterizing means, each having a dynamic reconfigurable processor, capable of executing rasterizing processes in parallel, and a storage medium which stores the computer-executable control program.

As described above, according to the present invention, hardware resources can be reconfigured in accordance with the attribute of output data of an object base. A method of drawing images which executes scheduling and, more particularly, dynamic scheduling or reconfiguration to reduce the waste of hardware resources and perform a high-speed drawing process, a circuit thereof, and a print control apparatus are provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

As the preferred embodiment of the present invention, a drawing processing circuit which is configured to reconfigure hardware resources in accordance with the attribute of print data based on an object and be able to execute scheduling and, more particularly, dynamic scheduling of reconfiguration, and an image output control apparatus having the circuit will be described below in detail. As described above, in this embodiment, the image output control apparatus will be described on the basis of a print control apparatus for controlling image output to a print means for printing an image. However, the present invention can also be applied to control of image output to a display means, and an apparatus therefor is also incorporated in the present invention.

Arrangement Example of Image Output Control Apparatus of Embodiment

Figure 1:
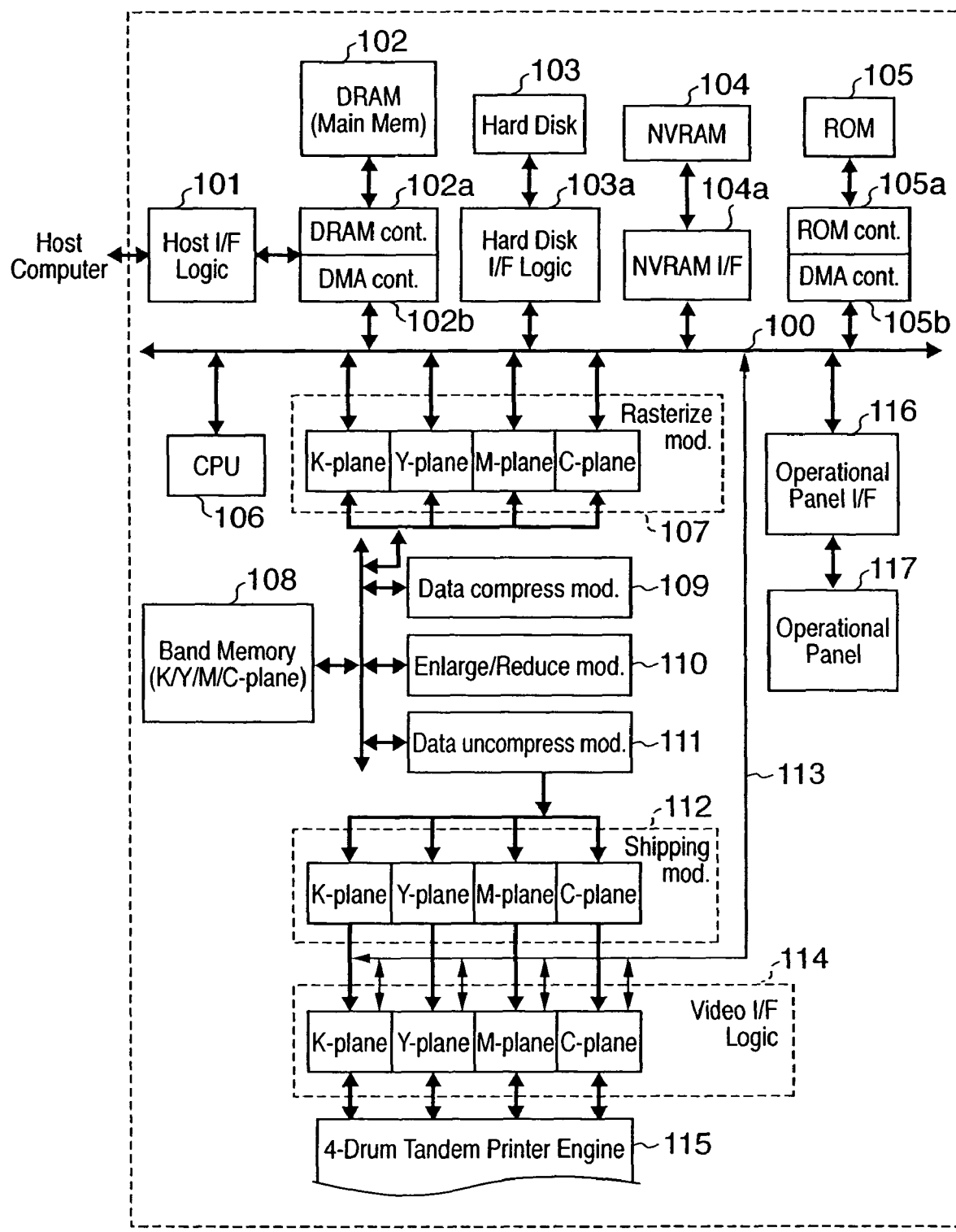
FIG. 1 is a block diagram showing the arrangement of an image output control apparatus according to an embodiment of the invention.

FIG. 1 is a block diagram showing an arrangement example of a printing apparatus including the image output control apparatus according to this embodiment. An example of the printing apparatus is a laser beam printer.

Referring to FIG. 1, a Host_I/F_Logic 101 receives print command data transferred from a host computer (not shown). The Host_I/F_Logic 101 stores received print command data in a DRAM 102 through a DRAM_cont. 102a. A DMA_cont. 102b is used to, e.g., transfer a DL (display list) stored in the DRAM 102 to a Rasterize_mod. 107.

A CPU 106 is an operation/control unit which controls the entire printing apparatus in accordance with a program stored in a ROM 105 (not shown). The CPU 106 controls the process procedures and synchronization between the constituent elements or controls a common bus (in cooperation with the DMA_cont.). Especially, the CPU 106 executes synchronous control for YMCK planes of the Rasterize_mod., Shipping_mod., or Video_I/F_Logic. The CPU 106 may execute the process of the Rasterize_mod. 107, a Data_compress_mod. 109, an Enlarge/reduce_mod. 110, or a Data_uncompress_mod. 111. However, as the load concentrate to the CPU 106 increases, the process speed decreases. To prevent this, each plane of the Rasterize_mod. 107 preferably has an independent CPU. The Data_compress_mod. 109, Enlarge/reduce_mod. 110, and Data_uncompress_mod. 111 preferably have a common CPU or independent CPUs. Especially in this example, each plane of the Rasterize_mod. 107 has an independent CPU to execute a rasterizing process independently of other planes (note that synchronization between the planes of a single object is controlled by the CPU 106).

The DRAM 102 is a page memory to temporarily store received data such as a command or data from the host computer. The DRAM 102 is also used as a main memory to store the above-described DL generated in accordance with a program described in the ROM 105. The DRAM 102 is also used as a font cache area. In addition, the DRAM 102 is also used as a work area which is used by the CPU 106 to execute each program. The ROM 105 stores the control program of the CPU 106, program data to implement a series of control corresponding to the flowcharts shown in FIGS. 3 and 6 (to be described later), and font data. The flowcharts shown in FIGS. 3 and 6 indicate control of each plane of the Rasterize_mod. 107. Each plane of the Rasterize_mod. 107 is preferably executed after programs or data are loaded from ROM 105 in a RAM provided for each plane (FIG. 2) of the Rasterize_mod. 107. The RAM provided for each plane is shared with a Config._data_memory 201 used for control by a Config._control 202. A DMA_cont. 105b is used to read out, via a ROM_cont. 105a, font data stored in the ROM 105 or load a control program in the Rasterize_mod. 107.

Reference numeral 103 denotes a Hard_Disk; 103a, a Hard_Disk_I/F_Logic; 104, an NV (non-volatile) RAM; and 104a, an NVRAM_I/F. The Hard_Disk 103 and NVRAM 104 are nonvolatile rewritable memories which store data with a large capacity or a changeable program.

The Rasterize_mod. (Rasterize module) 107 is separated into four planes to execute the drawing process. The Rasterize_mod. 107 rasterizes a DL read out from the DRAM 102 to bitmap data in accordance with the program stored in the ROM 105 (or the program loaded in the Rasterize_mod. 107). The bitmap data is stored in a Band Memory 108. The Data_compress_mod. 109 compresses the data rasterized by the Rasterize_mod. 107. The Enlarge/reduce_mod. 110 executes reduction printing or a character enlargement process. The Data_uncompress_mod. 111 is used to expand compressed data stored in the Band Memory 108.

A sync circuit (Shipping_mod.)_) 112 reads out image data from the Band Memory 108 and outputs the image data to a video_I/F_logic 114 in synchronism with paper conveyance of a color 4-Drum engine. A command/status control signal 113 controls the printer engine. Reference numbers 115 and 114 denote a printer engine and its I/F_logic, respectively. Reference numerals 117 and 116 denote a printer display panel and its I/F logic, respectively.

Example of Drawing Process of Embodiment

The types of attributes in an object drawing process, a structure example of a DL (Display List) and the relationship to an output image in the drawing process of this embodiment will be described next.

(Attributes for Drawing Processing)

The drawing circuit of this embodiment converts PDL into an intermediate code (DL). A drawn image is generated on the basis of following four attribute data contained in the intermediate code.

The first attribute is attribute indicating area data (hereinafter "AR: Area" is used) occupied by each drawn object on a printed image. The second attribute is attribute indicating outline data (hereinafter "MSK: Mask" is used) representing the boundary between the foreground and background, which is represented by the outline of a character or a graphic pattern such as a polygon or circle. The third attribute is attribute indicating pattern data of the foreground (hereinafter "FP: Fill_Pattern" is used), which is represented by a pattern that fills a drawn object. The fourth attribute is attribute indicating the filled color data of the foreground (hereinafter "CG: Color_Gradation" is used).

The color of the foreground indicates the color of an object to be drawn. In drawing a character, it indicates the color of the character itself. When binary data is handled by one drawing plane, "background" indicates the hatching pattern of the plane to draw. When multilevel data is handled, "background" indicates the color of the foreground.

Figure 5:
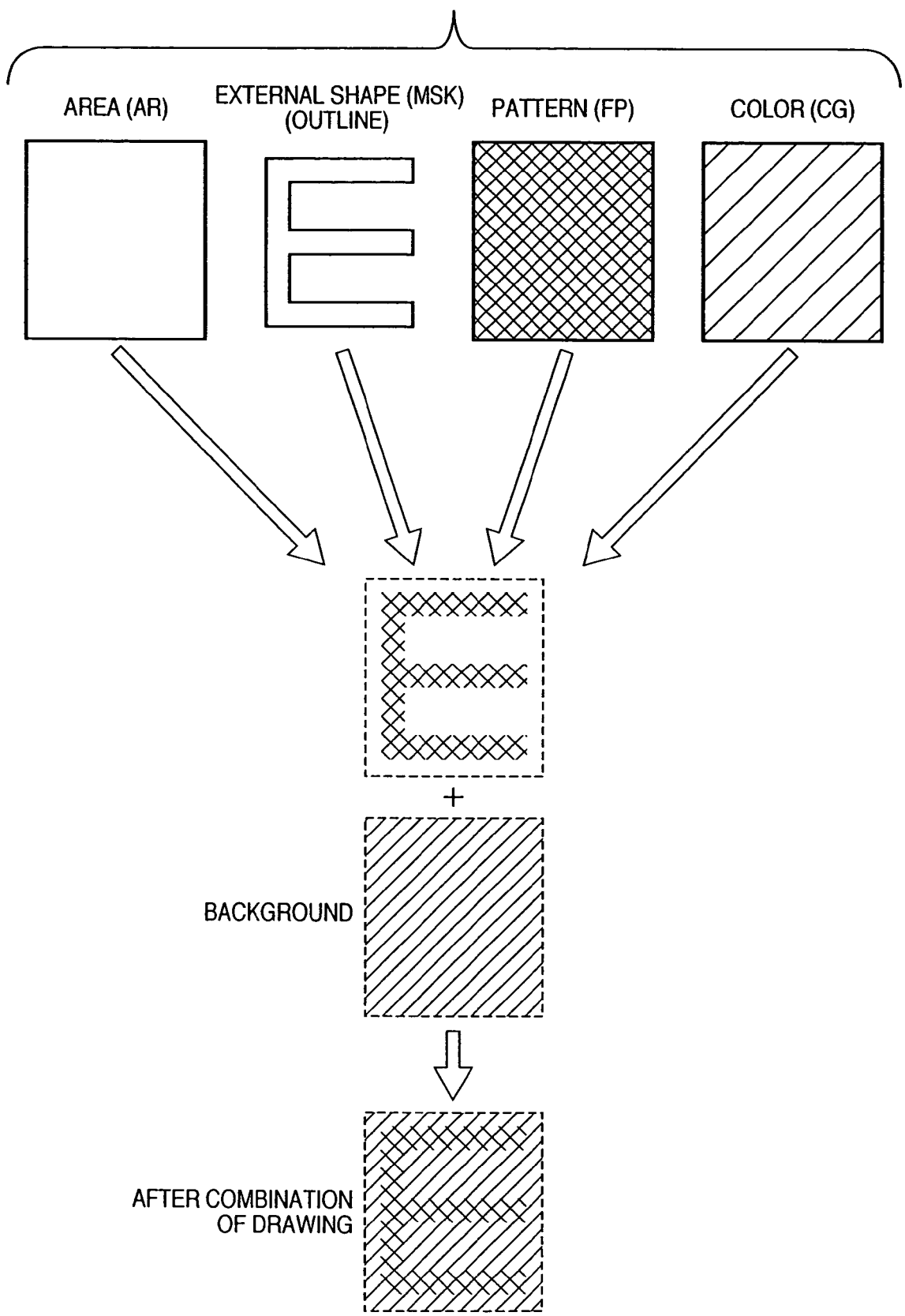
FIG. 5 is a view showing the attribute of a drawn object rasterized by the drawing processing circuit according to the embodiment.

Data based on the four kinds of attributes undergoes, after drawn and rasterized, a process of overlapping the data on background image data to be printed and then the overlapped data is stored in the Band Memory 108. FIG. 5 is a view showing an outline of the attributes and drawing process of an object.

Example of DL Structure in Embodiment

Figure 9:
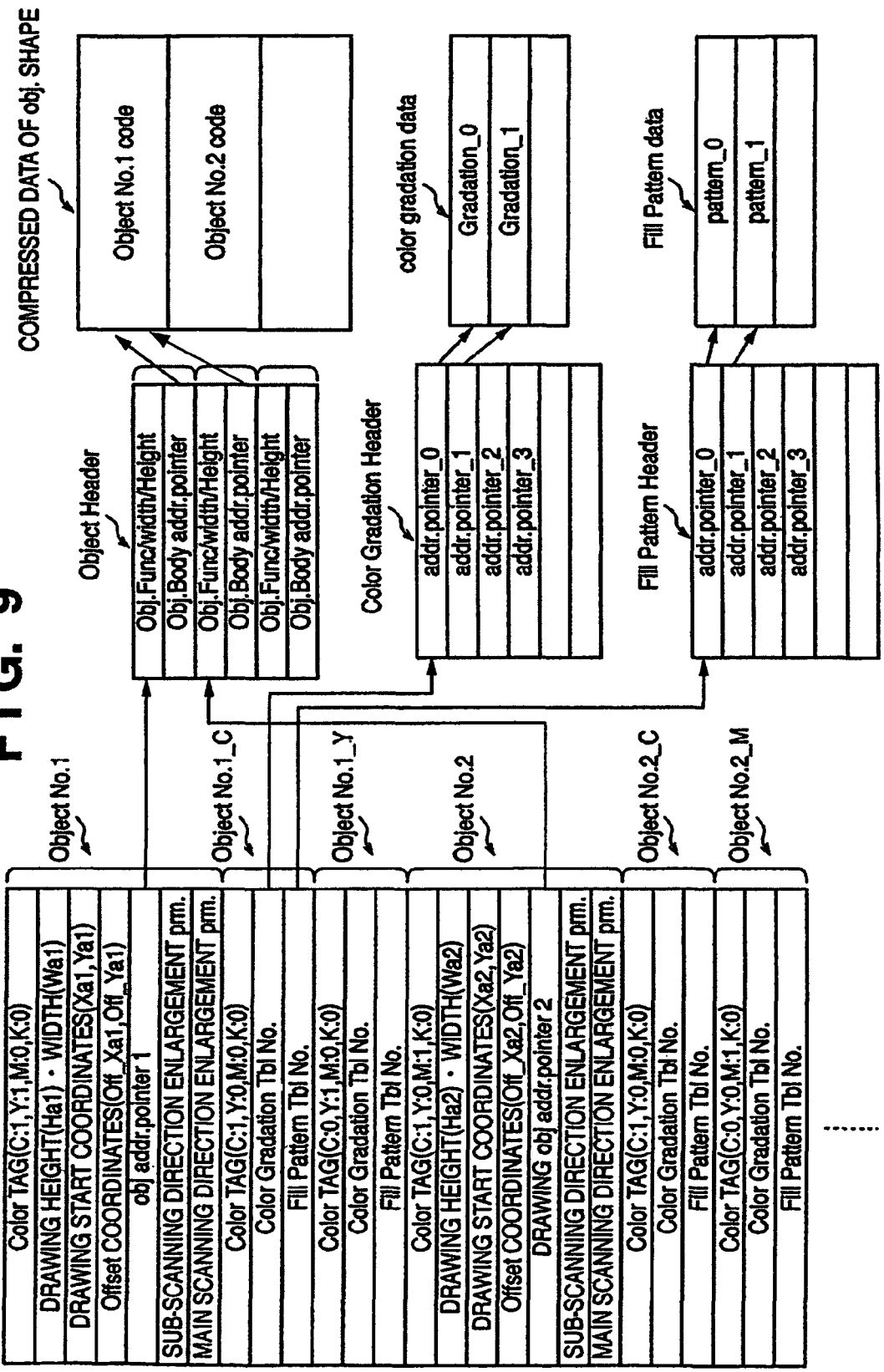
FIG. 9 is a view showing an example of an intermediate code (display list) decoded by the drawing processing circuit according to the embodiment.

FIG. 9 shows an example of codes and structure of intermediate data (display list) which represents coordinate information and attributes of drawn objects.

In each list, addr. is indirectly designated by using the pointer format for the sake of data management. For example, "obj._addr._pointer#" (#: 1, 2, 3, . . . ) in the list is addr._pointer indicating Memory_addr. where the header of the drawn object is stored. The header of an object includes Function_code representing the type (e.g., character, graphic, image, background data, color data) of the drawn object, width and height parameters, and addr._pointer representing the start address of the memory which stores the compression code body of the character.

Referring to FIG. 9, Object_No.1 and Object_No.2 are listed.

The first to seventh rows represent information of the common attribute, i.e., the area and shape (external shape and outline) of Object_No.1. The eighth to 10th rows represent information of the attribute, color (Color_Gradation), and pattern (Fill_Pattern) of cyan (C) of Object_No.1. The 11th to 13th rows represent information of the attribute, color, and pattern of yellow (Y) of Object_No.1. Object_No.1 has no information of magenta (M) and black (K).

The 14th to 20th rows represent information of the common attribute, i.e., the area and shape (external shape and outline) of Object_No.2. The 21st to 23rd rows represent information of the attribute, color, and pattern of cyan (C) of Object_No.2. The 24th to 26th rows represent information of the attribute, color, and pattern of magenta (M) of Object_No.2. Object_No.2 has no information of yellow (Y) and black (K).

Drawing Example of Output Image of Embodiment

Figure 10:
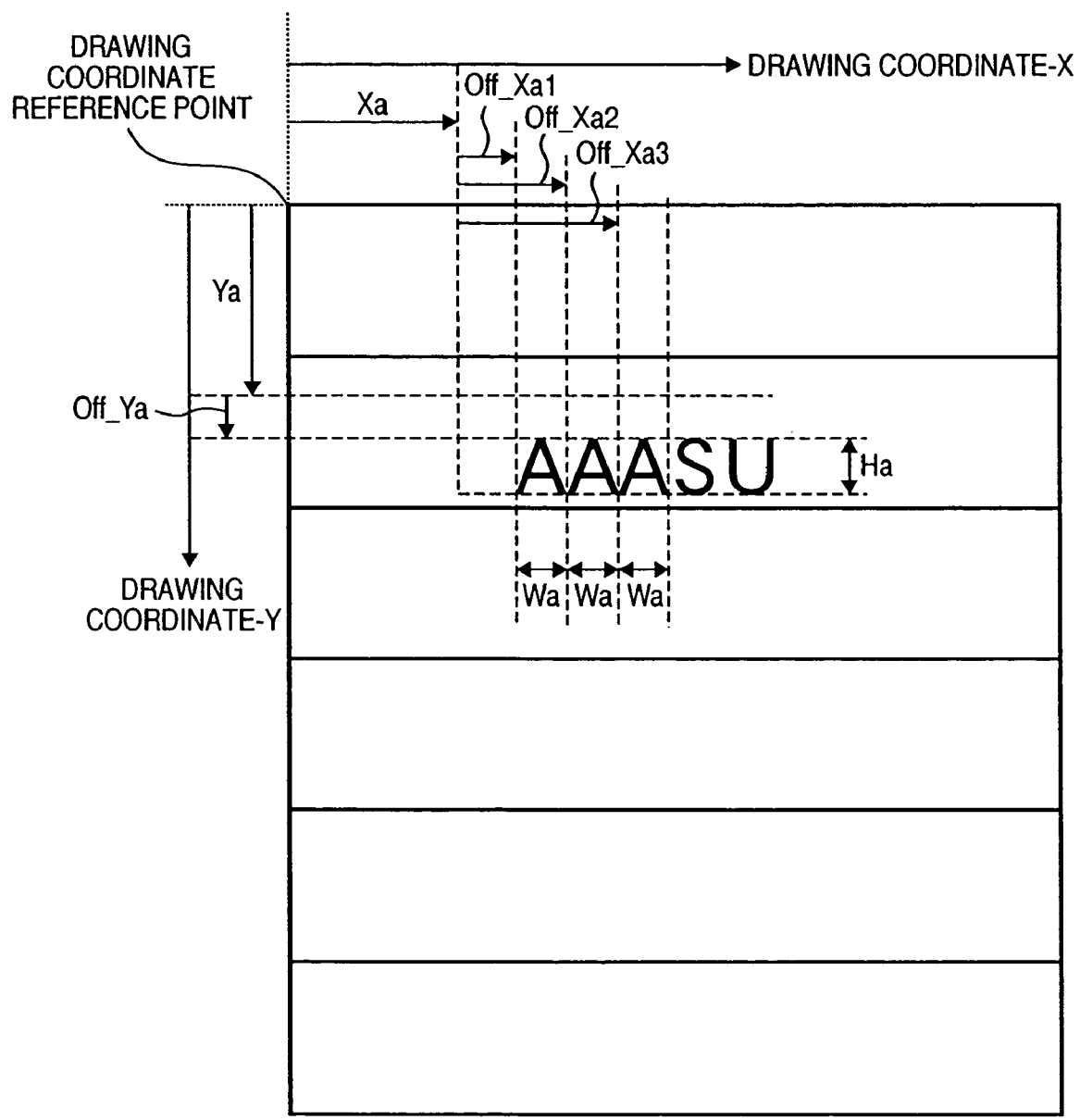
FIG. 10 is a view showing the relationship between a drawn object and coordinates for drawing according to the embodiment.

FIG. 10 is a view showing the relationship between the parameters in the display list in FIG. 9 and the actual drawn object. Each of characters "A", "A", "A", "S", and "U" in FIG. 10 is a drawn object unit. The relationship between FIG. 10 and the values shown in FIG. 9 will briefly be described. The list in FIG. 9 includes only Object_No. 1 and Object_No. 2 which are made to correspond to the leftmost "A" and the adjacent "A" in FIG. 10.

The drawing height (Ha1) and width (Wa1) of the second row in FIG. 9 correspond to the height (Ha) and width (Wa) of the first character "A" in FIG. 10. Since the characters have the same height and same width, the values representing the height (Ha1) and width (Wa1) of Object_No. 1 equal the values representing the height (Ha2) and width (Wa2) of Object_No. 2. The drawing start coordinates (Xa1, Ya1) of the third row correspond to Xa and Ya in FIG. 10. The Offset coordinates (Off_Xa1, Off_Ya1) of the fourth row correspond to Off_Xa1 and Off_Ya in FIG. 10. That is, the drawing start position (the upper left point of the area) of the first "A" is indicated by (Xa+Off_Xa1) in the X direction (rightward) and Ya+Off_Ya) in the Y direction (downward) from the drawing coordinate reference point. Since Xa1=Xa2, Ya1=Ya2, and Off_Ya1=Off_Ya2, FIG. 10 expresses Xa, Ya, and Off_Ya.

A rectangle having the height (downward) Ha and width (rightward) Wa from the drawing start position (Xa+Off_Xa1, Ya+Off_Ya) corresponds to "area" of the attribute.

Object_Header to Obj._Func. pointed by obj._addr._pointer 1 indicates information to specify a character (including the font type). The width (width) and height (Height) are the same as those of the area. As the compressed data of an object shape indicated by Obj._Body_addr._pointer, the compressed data of the character "A" is stored in Object_No. 1_Code. This Object_No. 1_code corresponds to an "external shape (outline)" of the attribute.

The above-described Color_Gradation corresponds to "color" of the attribute, and Fill_Pattern corresponds to "pattern" of the attribute.

Almost the same as the above-described structure applies to the next "A" of Object_No. 2 except that it has a color different from "A" of Object_No. 1. FIG. 9 shows that obj._addr._pointer2 of the 18$^{th}$ row indicates Object_No. 2_code. However, since the character is the same as "A" of Object_No. 1, obj. body addr. pointer indicates Object_No. 1_code.

Separation Example of Rasterizing Process in Embodiment

How to separate the rasterizing process of this embodiment to cause a plurality of reconfigurable processors to execute the process will be described next.

The rasterizing process of this embodiment is basically executed for each line. That is, intermediate data is separable between lines independently of the attribute. Hence, page data can be separated for each line and rasterized. In this case, for example, "color CG can be separated into rectangular areas each having 64×64 pixels. In the process of "outline (MSK)", a line_skip function can be used. With this line_skip function, even when the upper half line and lower half line of a rasterizing area are separated, the rasterizing process can be started from the start of the lower half line while skipping the upper half line.

As described above, this embodiment employs the rule that separation is done for each line. However, this is merely an example. Any other rasterizing process capable of another type of separation is also applied.

Configuration Example of Drawing Processing Circuit of Embodiment

Figure 2:
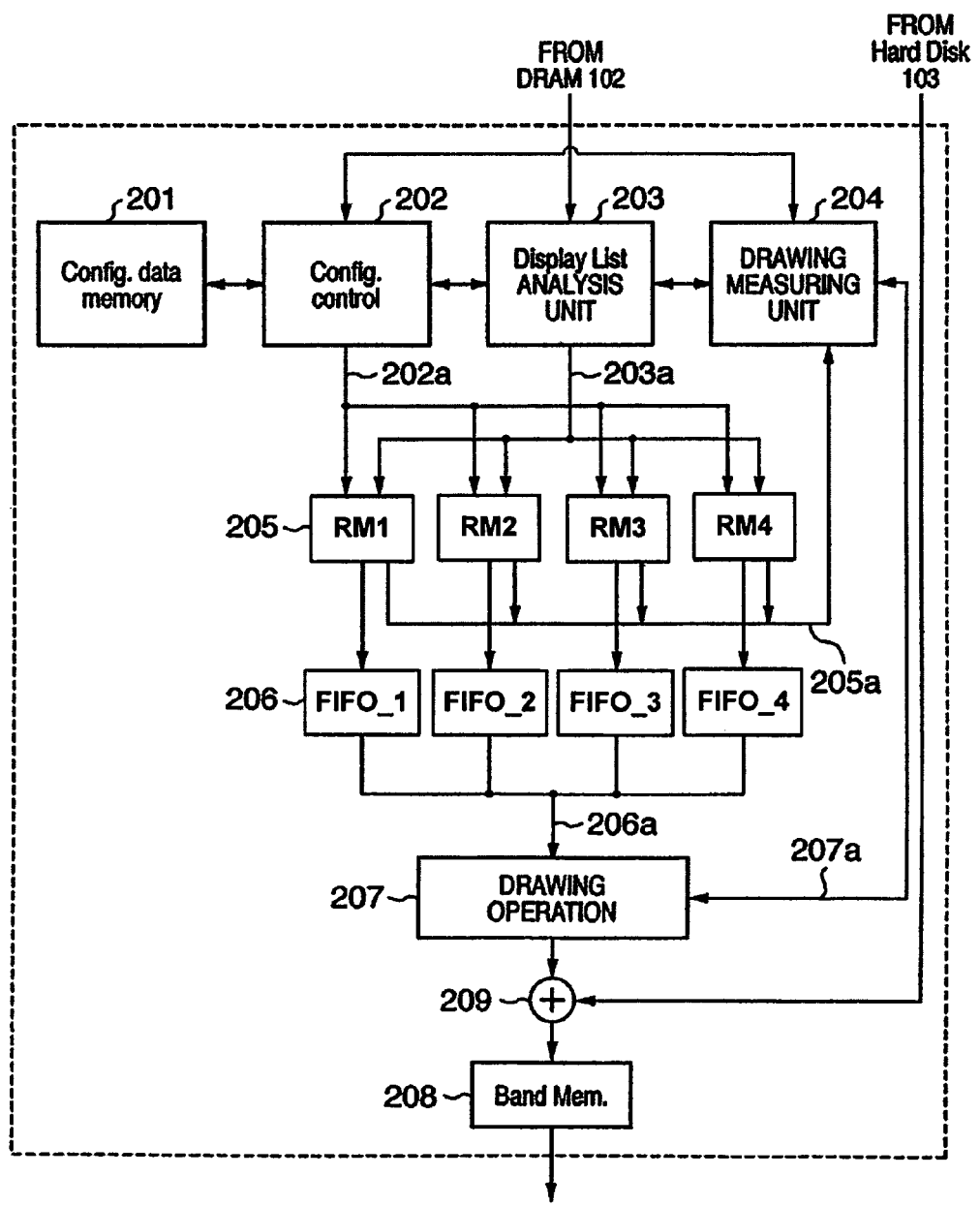
FIG. 2 is a block diagram showing the arrangement of Rasterize_module in the image output control apparatus according to the embodiment.

FIG. 2 shows a configuration example of Rasterized_module serving as a drawing processing circuit for K, Y, M, and C planes in FIG. 1. The circuit shown in FIG. 2 is provided for each plane. That is, four circuits are present in total. The constituent elements will be described below.

Referring to FIG. 2, RM1 to RM4 205 are reconfigurable processor modules (i.e., reconfigurable processor circuit modules) used in this embodiment. The process to be executed by RM1 to RM4 will be described later. FIFOs 206 store output data from the RM1 to RM4. The FIFOs 206 sequentially store output data rasterized by the RM1 to RM4 for each pixel (each drawn pixel) from the drawing start position (normally the upper left point) of the drawing area. A Config._data_memory 201 stores data to reconfigure the drawing circuit. The control unit (Config._control) 202 monitors to which of the reconfigurable processors RM1 to RM4 the data should be loaded, reads out the data from the memory, and controls circuit reconfiguration of the modules. The Config._data_memory 201 also stores a program to manage the schedule of reconfiguration of the RM1 to RM4 by inputs 202a from the Config._control 202.

A Display_List analysis unit 203 analyzes the intermediate code (display list: FIG. 9) converted from PDL (Page Description Language) and creates data that provides inputs 203a to be rasterized by the RM1 to RM4 for each attribute of the drawn object (or the corresponding intermediate code may be used directly). A drawing measuring unit 204 predicts, from the intermediate code received along line 205a, the process time necessary for the drawing/rasterizing process of each attribute, receives feedback (at 207a) of progress from a drawing operation processing unit 207 (hereinafter also called as "BPU: Bit Processing Unit", to be described later), and corrects the predicted time. The drawing operation processing unit 207 executes operations such as layer on/off and superimposition for each pixel of drawn data of each attribute rasterized by the RM1 to RM4 in accordance with a drawing logic described in the display list. A Band_Mem. 208 serves as a buffer before the data which has undergone the above-described operation is sent to the printer engine.

The Band Memory 108 shown in FIG. 1 must have a capacity to allow the Band_Mem. 208 to store at least data of four planes. When buffering for a high-speed process is taken into consideration, a capacity for eight planes is preferably prepared. An adder 209 is used to superimpose background data (e.g., form overlay, logotype, watermark, and ruled lines) shown in FIG. 5, which is stored in the Hard_Disk 103 in FIG. 1 by the operator in advance, on the rasterized drawn data from the host.

To store data rasterized by the RM1 to RM4 in the FIFOs 206 and combine the data by the drawing operation processing unit 207, any of the following methods can be used.

(1) A tag to identify the attribute and Object_No is added to the start of data output from each of the RM1 to RM4, thereby identifying the data.

(2) A signal indicating the correspondence between the drawn Obj.No. and the type of attribute processed by each RM is output from the Config._control 202 to the BPU 207 in FIG. 2.

(3) The FIFOs 206 in the succeeding stage of the RMs are assigned to area, outline, color, and pattern, respectively. The BPU 207, e.g., makes the data read out at 206a from FIFO_1 to FIFO_4 correspond to the attributes.

FIG. 2 illustrates the Config._control 202, Display_List analysis unit 203, drawing measuring unit 204, and drawing operation unit 207 as independent constituent elements. However, these elements can be implemented by software by a common computer including a CPU and memory. In this case, one memory may be shared as the Config._data_memory 201, the memory to load the program of the CPU, and the memory to load Display_List.

(Reconfigurable Processor Module)

The reconfigurable processor modules (RM1 to RM4) will briefly be described here.

A reconfigurable processor module is a logic device which can dynamically be reconfigured (or reconstructed). The reconfigurable processor module is not a dedicated circuit having a specific function but implements the same function as a dedicated circuit by switching, by software, the configuration of connection and setting of operation of a plurality of necessary circuits which are prepared in advance. Some modules are capable of such switching even during the operation. Especially, a reconfigurable processor which can dynamically be reconfigured is often called a dynamic reconfigurable processor.

Generally, a dynamic reconfigurable processor prepares in advance a plurality of hardware elements each of which has partial units of necessary circuits in a chip (logic device). Parameters and programs for unit selection, order of connection, and setting of operation are stored in a memory in advance. The stored programs and parameters are switched instantaneously during the operation by software so that the dynamic reconfigurable processor behaves like a chip having a dedicated circuit in accordance with process contents. That is, the reconfigurable processor (RM) of this embodiment can be operated first as an area (AR) drawing circuit and then reconfigured and operated as an outline (MSK) drawing circuit by switching the parameters and programs.

Techniques based on this idea, represented by FPGA, have existed from long ago. The dynamic reconfigurable processor is superior to FPGA because of high integration and high speed which allows dynamic switching.

Since FPGA includes a gate array as a component, the executable process also corresponds to the logic gate prepared in advance. However, a unit included in a reconfigurable processor generally corresponds to a small-scale processor or a functional block in a processor data path. For this reason, the reconfigurable processor module can implement a more advanced process than FPGA.

Several embodiments to explain the present invention employ the dynamic reconfigurable technique as a drawing circuit. However, the present invention is not limited to this if the same process can be executed.

Operation Example of Drawing Processing Circuit of Embodiment

Figure 3:
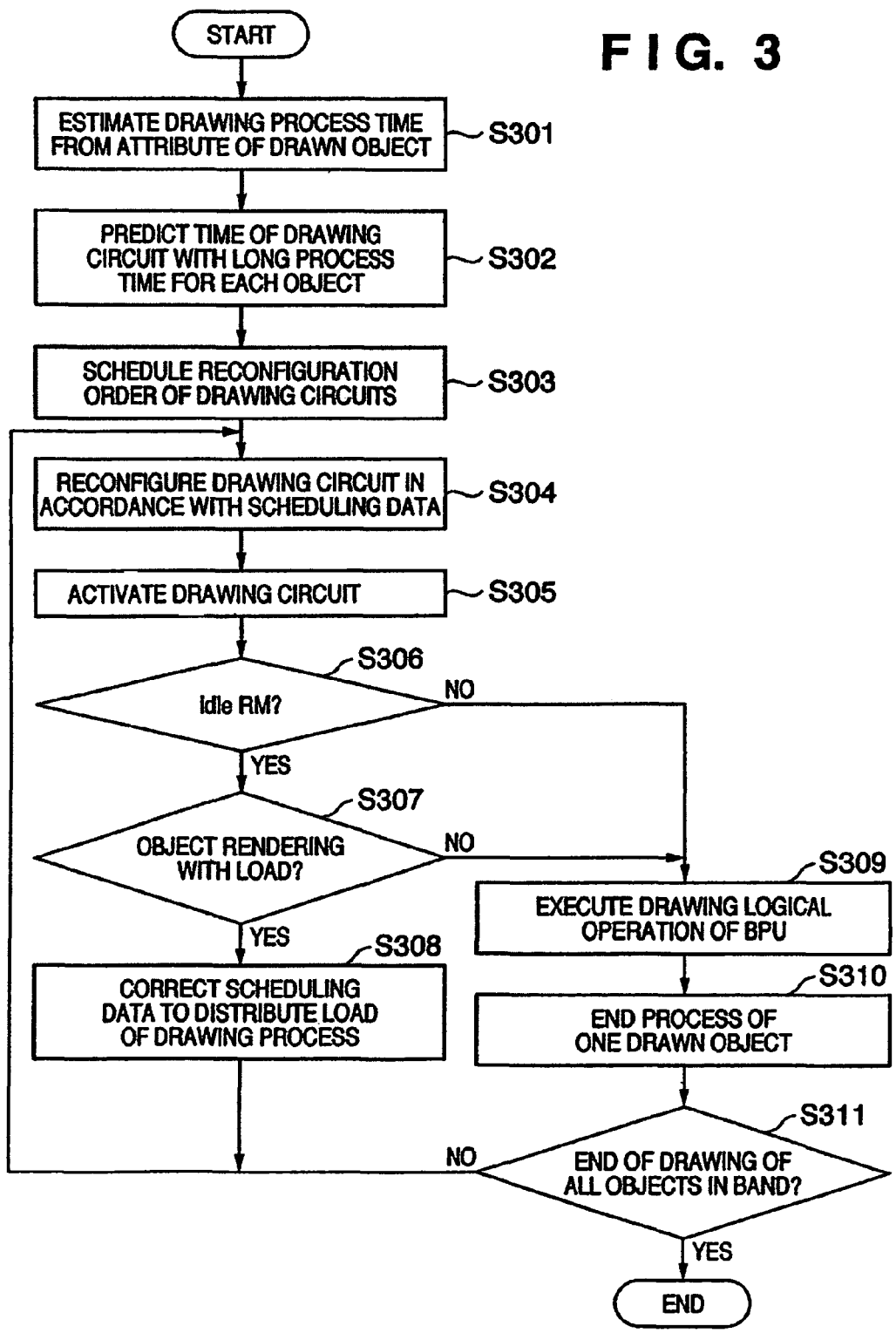
FIG. 3 is a flowchart for explaining the first example of the process procedures of the image output control apparatus according to the embodiment.

FIG. 3 is a flowchart showing an example of procedures of reconfiguration of each drawing processing circuit in the image output control apparatus shown in FIGS. 1 and 2. In this embodiment, the procedures are preferably executed by the independent CPU of each drawing processing circuit. However, the procedures may be executed by the CPU 106 in FIG. 1 if it can do a high-speed process without load even when constituent elements execute the steps.

In step S301, the drawing process time for drawing one band is estimated by the drawing measuring unit 204 of FIG. 2 from the attribute of the drawn object in the corresponding band. In step S302, the process time in the drawing circuit is predicted for each drawn object. On the basis of the prediction result, in Step S303, the order to reconfigure the drawing circuit is scheduled by the Config._control 202 in FIG. 2. The information (scheduling data) is stored in the Config._data_memory 201 in FIG. 2.

In step S304, configuration data of the drawing circuit, which is necessary for drawing the first drawn object, is read out from the Config._data_memory 201 in FIG. 2 in accordance with the scheduling data, and the RM1 to RM4 in FIG. 2 are configured. In step S305, the drawing hardware is activated. When the hardware is activated, the RM1 to RM4 which are configured on the basis of the configuration data start rasterizing drawn data corresponding to the attribute of each drawn object. Rasterized data are sequentially stored in the FIFOs 206 in FIG. 2.

In step S306, it is determined upon receiving status signals from the RM1 to RM4 whether any one of the RM1 to RM4 has ended the drawing process early. This step is executed by the drawing measuring unit 204 in FIG. 2. In step S307, it is determined upon receiving prediction information and current process status (drawing is progressing or drawing is ended) from the drawing measuring unit 204 whether there is an attribute of an object which would take more time for the drawing process. If it is predicted that a specific attribute would take longer process time than other attributes, the scheduling data stored in the Config._data_memory 201 in FIG. 2 is corrected in step S308 to distribute the load. On the basis of the scheduling data, the process from step S304 is executed again.

If it is determined in step S306 that no RM has ended the drawing process early or in step S307 that no drawn object has an attribute to result in a bottleneck, drawing logical operation (BPU) is executed in Step S309. Then, the process of the drawn object is ended in step S310. In step S311, it is checked whether all drawn objects in the band which is currently undergoing the drawing process are rasterized. The above-described process is executed repeatedly.

Timing Example of Drawing Process of Embodiment

Figure 4:
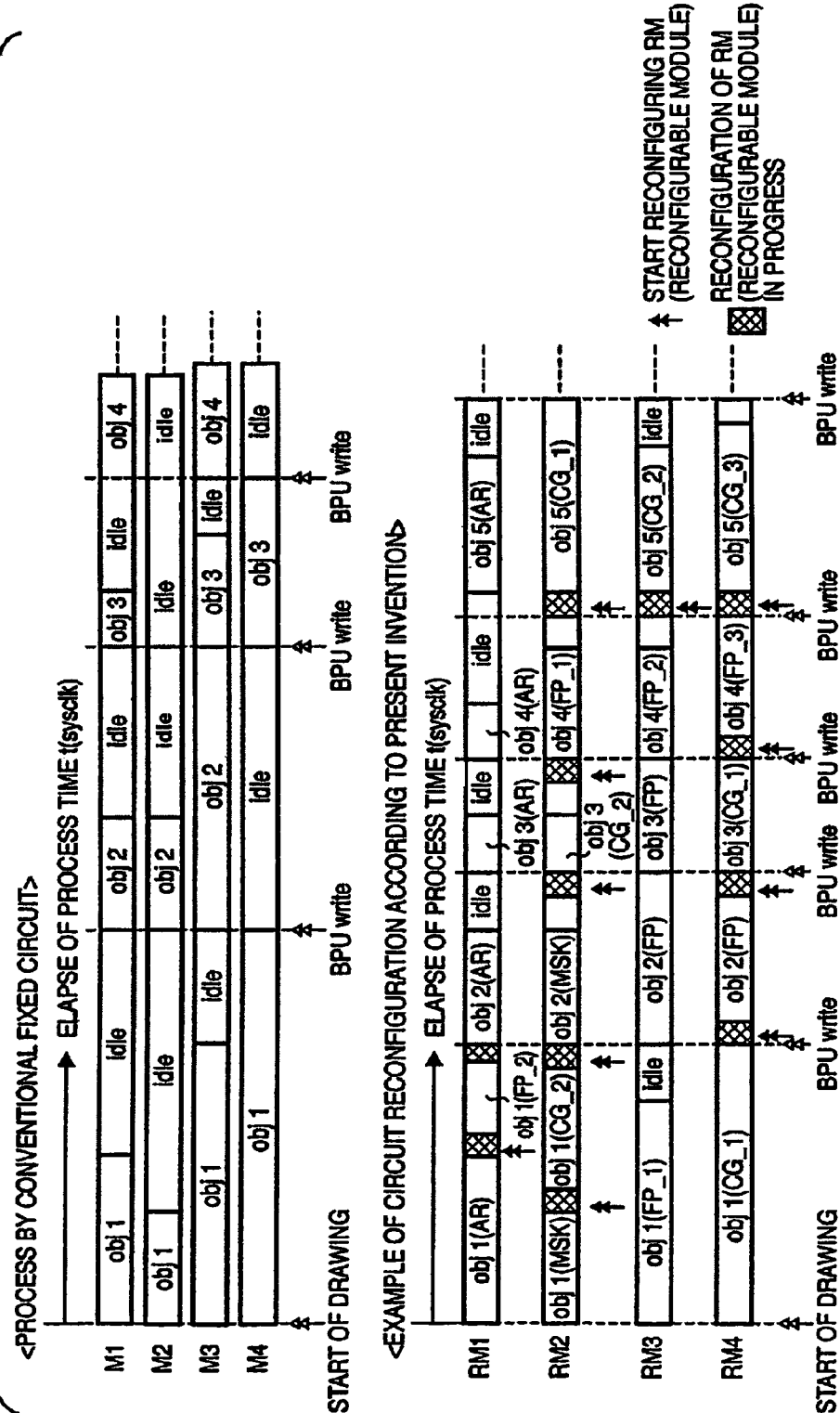
FIG. 4 is a timing chart showing the first example of the reconfiguration timing of a drawing processing circuit according to the embodiment.

FIG. 4 shows a comparison of process time between a conventional fixed circuit configuration (upper portion of FIG. 4) and a drawing circuit (RM) reconfigured by correcting scheduling (lower portion of FIG. 4) in accordance with the flowchart in FIG. 3. The RM1 to RM4 are reconfigurable circuit modules to parallelly process area data (AR), outline data (MSK), color data (Color_Gradation), and pattern date (Fill_Pattern) as the attribute of a drawn object. The abscissa of the timing chart represents the process time required by the RM1 to RM4 to execute the process.

In the prior art shown on the upper portion of FIG. 4, for example, even when the process of "area (AR)" and "outline (MSK)" by the M1 and M2 is ended early in drawing drawn object 1, the drawing operation module, i.e., the bit processing unit 207 in FIG. 2 cannot start the drawing process of next object 2 until the process of "pattern (Fill_Pattern)" by the M3 is ended. For this state, the modules are set in a standby (idle) state.

In the example of this embodiment shown on the lower portion of FIG. 4, the modules such as the RM1 and RM2 which have ended the drawing process early undergo circuit reconfiguration. For this reasons, the rasterizing process of drawn object 1 is ended earlier than in the prior art. Hence, the drawing operation module (BPU) can eventually start the process of drawn object 2 early. This also applies to drawn objects 2, 3, 4 . . . .

When the present invention is applied, the time required for drawn objects 1 to 4 can greatly be shortened as compared to the conventional fixed processing circuit.

More specifically, instead of executing the drawing process after PDL is analyzed and converted into an intermediate code (display list) as a fixed hardware process, the circuit configuration is dynamically changed in consideration of the actual process time of the circuit and the data size necessary for the process. With this arrangement, the process time required for rasterizing drawn objects per band to bitmap data can be shortened.

The reconfiguration shown on the lower portion of FIG. 4 is expressed by a considerable time width. However, the actual reconfiguration process can be implemented by one cycle of system clocks and rarely influences the overall process. Reconfiguration of the RM1 to RM4 may be done either by replacing the software programs and parameters or by including partial selection or reconnection of hardware.

Another Operation Example of Drawing Processing Circuit of Embodiment

In the above-described embodiment, scheduling or the estimated time is corrected on the basis of the process state in real time, i.e., by determining for reconfiguration of a drawing circuit whether drawing of each attribute is ended. In this operation example of the embodiment, the drawing process time required for each attribute is estimated in advance. Then, the circuit for an attribute with heavy load (time-consuming) is preferentially reconfigured.

Figure 6:
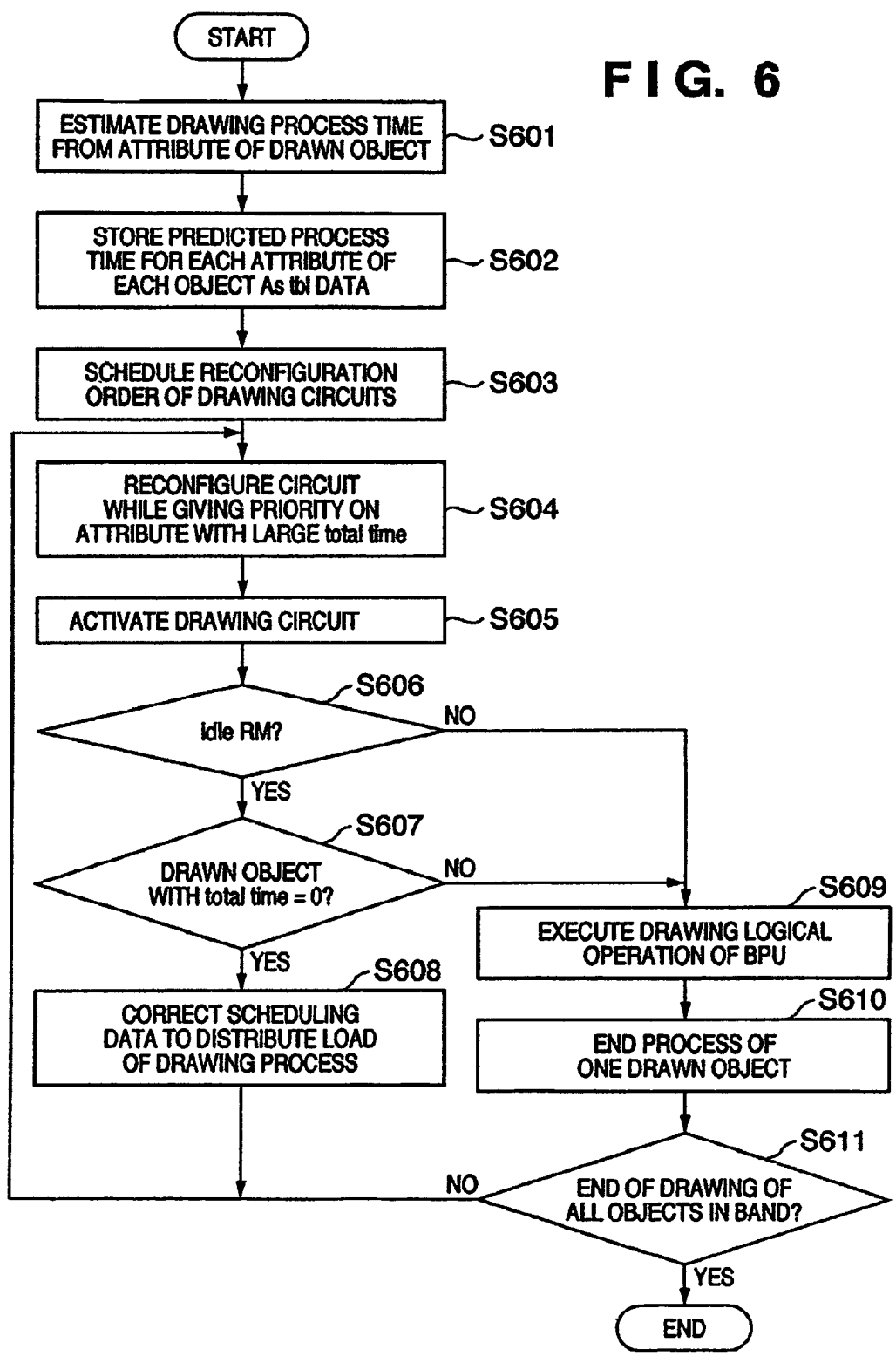
FIG. 6 is a flowchart for explaining the second example of the process procedures of the image output control apparatus according to the embodiment.

FIG. 6 is a flowchart showing the process procedures of this embodiment. The process will be described below in turn.

In step S601, the drawing process time is estimated from the attribute of each drawn object. In step S602, the process time for each attribute of an object is stored as tb1 DATA.

Figure 7:
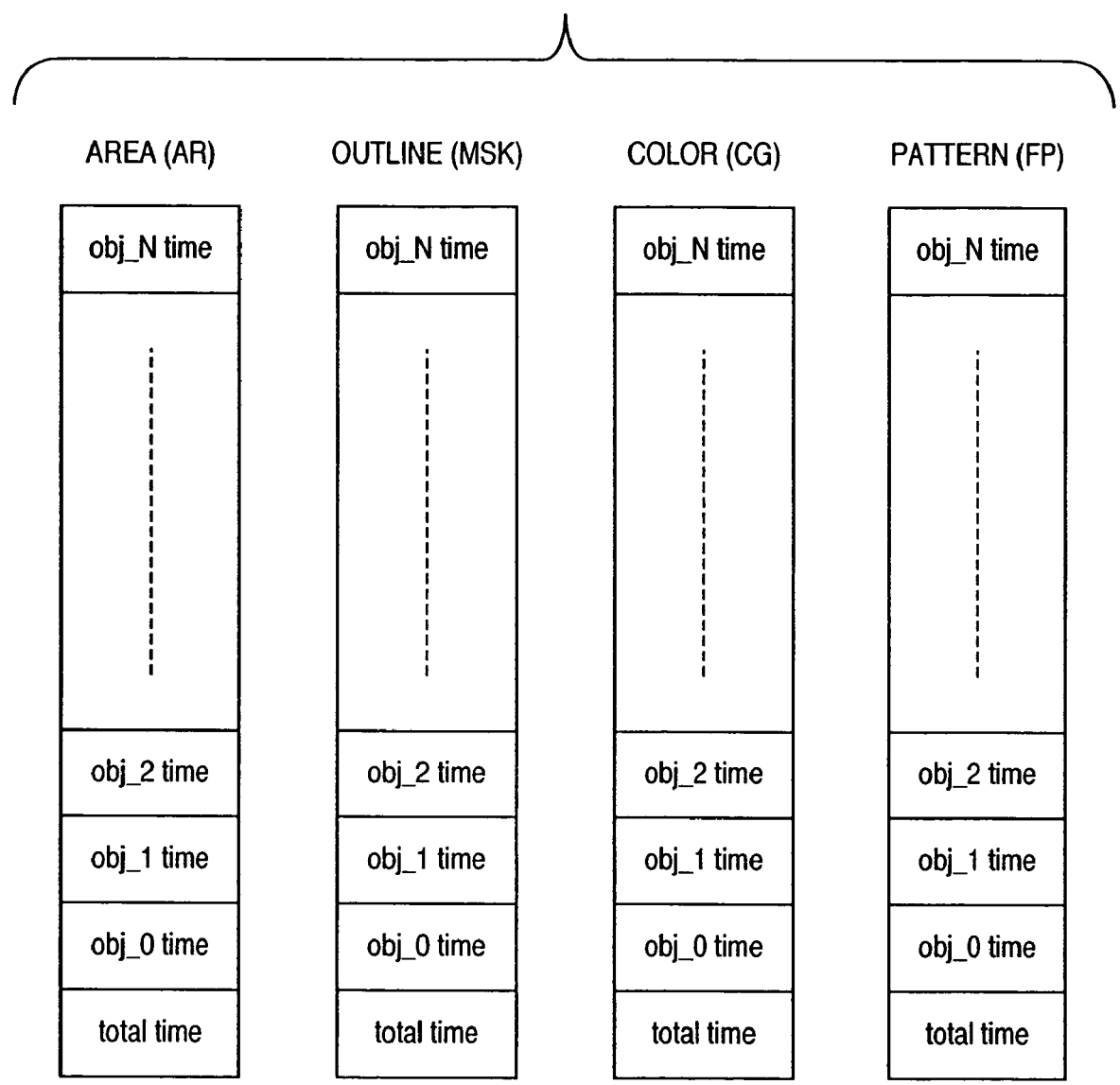
FIG. 7 is a view showing the structure of table data which stores the drawing process time of the drawing processing circuit according to the embodiment.

FIG. 7 shows an example of tb1 DATA stored in step S602 in FIG. 6. Referring to FIG. 7, assume that the first band includes N drawn objects, and the second band includes M drawn objects. After the predicted value of the drawing process time for each object is stored, total_time (actually, the time is represented by the number of cycles of system clocks) representing the total drawing process time of each of the attributes, i.e., A. area, B. outline, C. color, and D. pattern in each band is also predicted. Next, on the basis of the tb1 DATA, the order of reconfiguration of the drawing circuits is scheduled in Step S603. In step S604, the circuit reconfiguration order is determined by giving priority on an attribute with large total_time stored in the total data tb1 DATA.

The result is stored in the Config._data_memory 201 in FIG. 2. Then, the drawing hardware is activated in step S605. When the hardware is activated, the RM1 to RM4 start rasterizing drawn data corresponding to the attribute of each drawn object. Rasterized data are sequentially stored in the FIFOs 206 in FIG. 2. The drawing measuring unit 204 in FIG. 2 receives status signals from the modules RM1 to RM4 and senses in step S606 whether any one of the RM1 to RM4 has ended the drawing process early. In step S607, it is determined upon receiving prediction information and current process status (drawing is in progress or ended) from the drawing measuring unit 204 whether an attribute with total_time=0 (system cycle) for the drawing process is present in the current band. If YES in step S607, the scheduling data stored in the Config._data_memory 201 in FIG. 2 is corrected in step S608 to distribute the load. On the basis of the scheduling data, the process from step S604 is executed again.

If it is determined in step S606 that no RM has ended the drawing process early or in step S607 that no drawn object has an attribute to result in a bottleneck, drawing logical operation of BPU is executed in step S609. Then, the process of the drawn object is ended in step S610. In step S611, it is checked whether all drawn objects in the band, which are currently undergoing the drawing process, are rasterized. The above-described process is executed repeatedly.

Timing Example of Drawing Process of Embodiment

Figure 8:
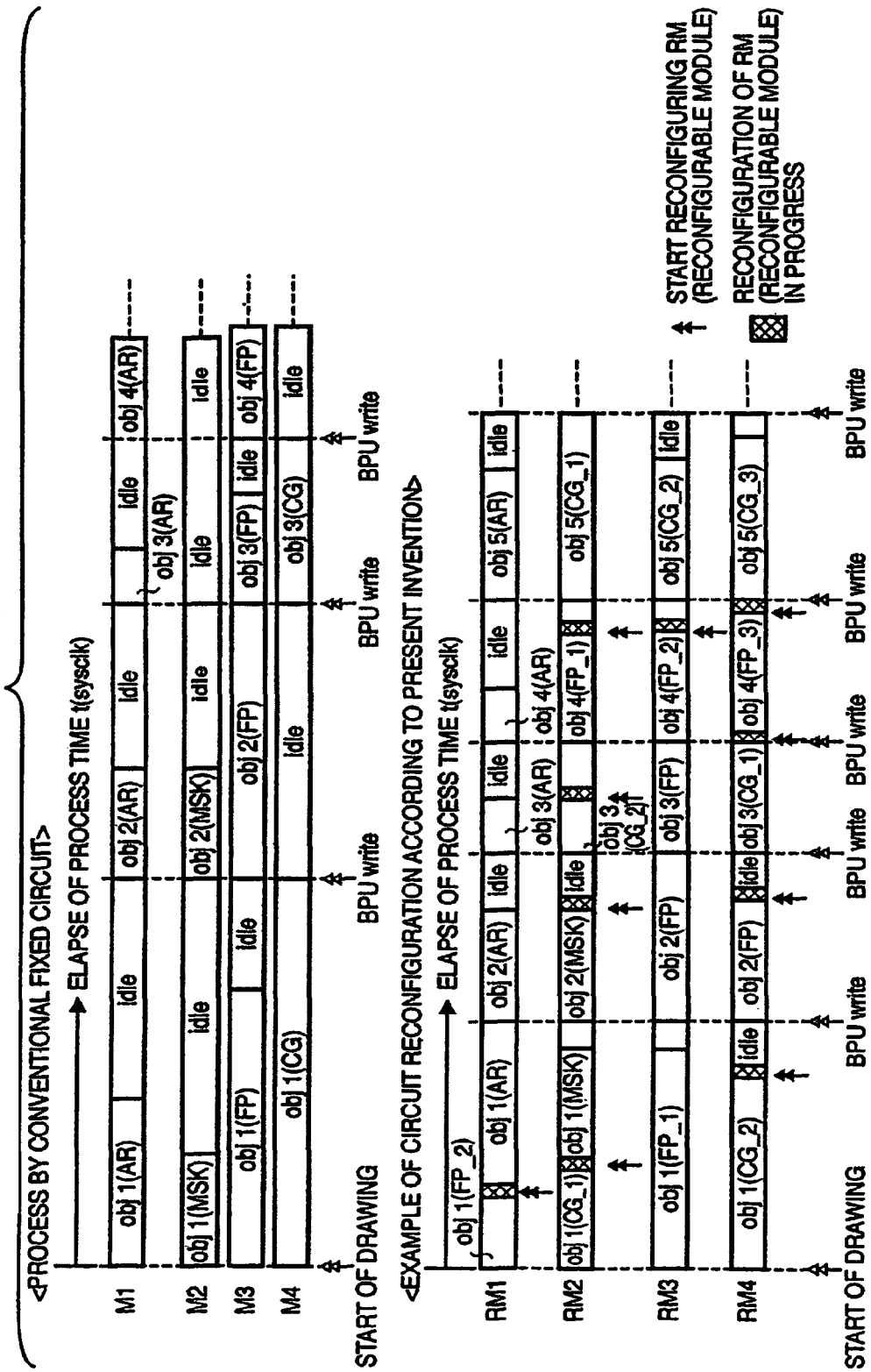
FIG. 8 is a timing chart showing the second example of the reconfiguration timing of the drawing processing circuit according to the embodiment.

FIG. 8 shows an example of reconfiguration of the RM1 to RM4 in FIG. 2 on the basis of the flowchart in FIG. 6.

Unlike FIG. 4 of the above-described embodiment, reconfiguration starts from "fill pattern (FP) and "color gradation (CG)", i.e., attributes which take the most process time for obj.1. After the reconfiguration is ended, the processing circuits for the attributes "area (AR)" and "outline (MSK)" are reconfigured.

When reconfiguration scheduling is executed in this way, the rasterizing process can be executed faster.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-275029 filed on Sep. 22, 2004, which is hereby incorporated by reference herein.

What is claimed is:

1. An image processing apparatus comprising:
   an object generation unit configured to receive data described by a page description language and to generate at least one object to be rasterized, the at least one object including plural kinds of attribute data, wherein the plural kinds of attribute data included in the at least one object include data indicating an area occupied by an object to be drawn, data indicating the object, data indicating a color of the object, and data indicating a pattern of the object;
   a plurality of rasterizing units configured to rasterize the at least one object generated by said object generation unit to bitmap data, each of said plurality of rasterizing units having a dynamic reconfigurable processor which can execute plural kinds of rasterizing processes respectively corresponding to the plural kinds of attribute data;
   a rasterizing time determination unit configured to determine, for every kind of attribute data, a rasterizing time required for executing rasterizing processes in which plural items of the same kind of attribute data included in a plurality of objects are rasterized into bitmap data;
   a schedule generation unit configured to generate scheduling data in which an order is scheduled of the plural kinds of rasterizing processes to be executed by the dynamic reconfigurable processor included in each of the plurality of rasterizing units, by estimating a rasterizing time required for executing each of the plural kinds of rasterizing processes by the dynamic reconfigurable processor included in each of the plurality of rasterizing units; and
   a reconfiguration unit configured to reconfigure the dynamic reconfigurable processor included in each of the plurality of rasterizing units so as to change the plural kinds of rasterizing processes to be executed by the dynamic reconfigurable processor in the order scheduled in the scheduling data, during rasterizing the at least one object generated by said object generation unit,
   wherein, in a case that a rasterizing process of attribute data assigned to a specific rasterizing unit of the plurality of rasterizing units is completed and rasterizing processes of attribute data assigned to remaining rasterizing units of the plurality of rasterizing units are not completed when plural kinds of attribute data are included in a specific object, said schedule generation unit updates the scheduling data to make the specific rasterizing unit execute one of the rasterizing processes of attribute data assigned to the remaining rasterizing units, and said reconfiguration unit reconfigures the dynamic reconfigurable processor included in the specific rasterizing unit based on the updated scheduling data so as to change a kind of rasterizing process which the dynamic reconfigurable processor in the specific rasterizing unit executed to another kind of rasterizing process which a dynamic reconfigurable processor in one of the remaining rasterizing units is executing, and wherein said schedule generation unit corrects the generated scheduling data so as to make rasterizing times in which the rasterizing processes for the plural kinds of attribute data are respectively completed by the plurality of rasterizing units substantially equal to each other.

2. The apparatus according to claim 1, wherein said plurality of rasterizing units execute the plural kinds of rasterizing processes in a unit of segmented data obtained by segmenting page-oriented data by a predetermined amount of data.

3. An image processing apparatus which includes a drawing processing circuit to receive data described by a page description language and to rasterize the received data to bitmap data, and which outputs the bitmap data rasterized by said drawing processing circuit to an output device, said drawing processing circuit comprises:

an object generation unit configured to receive data described by a page description language and generate at least one object to be rasterized, the at least one object including plural kinds of attribute data, wherein the plural kinds of attribute data included in the at least one object include data indicating an area occupied by an object to be drawn, data indicating the object, data indicating a color of the object, and data indicating a pattern of the object;

a plurality of rasterizing units configured to rasterize the at least one object generated by said object generation unit to bitmap data, each of said plurality of rasterizing units having a dynamic reconfigurable processor which can execute plural kinds of rasterizing processes respectively corresponding to the plural kinds of attribute data;

a rasterizing time determination unit configured to determine, for every kind of attribute data, a rasterizing time required for executing rasterizing processes in which plural items of the same kind of attribute data included in a plurality of objects are rasterized into bitmap data;

a schedule generation unit configured to generate scheduling data in which an order is scheduled of the plural kinds of rasterizing processes to be executed by the dynamic reconfigurable processor included in each of the plurality of rasterizing units, by estimating a rasterizing time required for executing each of the plural kinds of rasterizing processes by the dynamic reconfigurable processor included in each of the plurality of rasterizing units; and a reconfiguration unit configured to reconfigure the dynamic reconfigurable processor included in each of the plurality of rasterizing units so as to change the plural kinds of rasterizing processes to be executed by the dynamic reconfigurable processor in the order scheduled in the scheduling data, during rasterizing of the at least one object generated by said object generation unit, wherein, in a case that a rasterizing process of attribute data assigned to a specific rasterizing unit of the plurality of rasterizing units is completed and rasterizing processes of attribute data assigned to remaining rasterizing units of the plurality of rasterizing units are not completed when plural kinds of attribute data are included in a specific object, said schedule generation unit updates the scheduling data to make the specific rasterizing unit execute one of the rasterizing processes of attribute data assigned to the remaining rasterizing units, and said reconfiguration unit reconfigures the dynamic reconfigurable processor included in the specific rasterizing unit based on the updated scheduling data so as to change a kind of rasterizing process which the dynamic reconfigurable processor in the specific rasterizing unit executed to another kind of rasterizing process which a dynamic reconfigurable processor in one of the remaining rasterizing units is executing, and wherein said schedule generation unit corrects the generated scheduling data so as to make rasterizing times in which the rasterizing processes for the plural kinds of attribute data are respectively competed by the plurality of rasterizing units substantially equal to each other.

4. A method of receiving data described by a page description language and rasterizing the received data to bitmap data by a plurality of rasterizing units, each having a dynamic reconfigurable processor, capable of executing plural kinds of rasterizing processes in parallel, the method comprising the steps of:

receiving data described by a page description language and generating at least one object to be rasterized, the at least one object including plural kinds of attribute data, wherein the plural kinds of attribute data included in the at least one object include data indicating an area occupied by an object to be drawn, data indicating the object, data indicating a color the of the object, and data indicating a pattern of the object;

determining a rasterizing time required for executing rasterizing processes in which plural items of the same kind of attribute data included in a plurality of objects are rasterized into bitmap data;

generating scheduling data in which an order is scheduled of the plural kinds of rasterizing processes, wherein the rasterizing processes respectively correspond to the plural kinds of attribute data, and are to be executed by the dynamic reconfigurable processor included in each of the plurality of rasterizing units, by estimating a rasterizing time required for executing each of the plural kinds of rasterizing processes by the dynamic reconfigurable processor included in each of the plurality of rasterizing units; and rasterizing the at least one object generated in the object generating step to bitmap data with reconfiguring the dynamic reconfigurable processor included in each of the plurality of rasterizing units so as to change the plural kinds of rasterizing processes to be executed by the dynamic reconfigurable processor in the order scheduled in the scheduling data, wherein, in a case that a rasterizing process of attribute data assigned to a specific rasterizing unit of the plurality of rasterizing units is completed and rasterizing processes of attribute data assigned to remaining rasterizing units of the plurality of rasterizing units are not completed when plural kinds of attribute data are included in a specific object, the step of generating scheduling data updates the scheduling data to make the specific rasterizing unit execute one of the rasterizing processes of attribute data assigned to the remaining rasterizing units, and the dynamic reconfigurable processor included in the specific rasterizing unit is reconfigured based on the updated scheduling data so as to change a kind of rasterizing process which the dynamic reconfigurable processor in the specific rasterizing unit executed to another kind of rasterizing process which a dynamic reconfigurable processor in one of the remaining rasterizing units is executing, and wherein the step of generating scheduling data corrects the generated scheduling data so as to make rasterizing times in which the rasterizing processes for the plural kinds of attribute data are respectively completed by the plurality of rasterizing units substantially equal to each other.

5. A non-transitory computer-readable storage medium which stores a computer executable control program making a computer accomplish a method of receiving data described by a page description language and rasterizing the received data to bitmap data by a plurality of rasterizing units, each having a dynamic reconfigurable processor, capable of executing plural kinds of rasterizing processes in parallel, the control program comprising the steps of:

receiving data described by a page description language and generating at least one object to be rasterized, the at least one object including plural kinds of attribute data;

wherein the plural kinds of attribute data included in the at least one object include data indicating an area occupied by an object to be drawn, data indicating the object, data indicating a color of the object, and data indicating a pattern of the object;

a rasterizing time determination unit configured to determine, for every kind of attribute data, rasterizing time required for executing rasterizing processes in which plural items of the same kind of attribute data included in a plurality of objects are rasterized into bitmap data;

generating scheduling data in which an order is scheduled of the plural kinds of rasterizing processes, wherein the rasterizing processes respectively correspond to the plural kinds of attribute data, and are to be executed by the dynamic reconfigurable processor included in each of the plurality of rasterizing units, by estimating a rasterizing time required for executing each of the plural kinds of rasterizing processes by the dynamic reconfigurable processor included in each of the plurality of rasterizing units; and rasterizing the at least one object generated in the object generating step to bitmap data with reconfiguring the dynamic reconfigurable processor included in each of the plurality of rasterizing units so as to change the plural kinds of rasterizing processes to be executed by the dynamic reconfigurable processor in the order scheduled in the scheduling data, wherein, in a case that a rasterizing process of attribute data assigned to a specific rasterizing unit of the plurality of rasterizing units is completed and rasterizing processes of attribute data assigned to remaining rasterizing units of the plurality of rasterizing units are not completed when plural kinds of attribute data are included in a specific object, the step of generating scheduling data updates the scheduling data to make the specific rasterizing unit execute one of the rasterizing processes of attribute data assigned to the remaining rasterizing units, and the dynamic reconfigurable processor included in the specific rasterizing unit is reconfigured based on the updated scheduling data so as to change a kind of rasterizing process which the dynamic reconfigurable processor in the specific rasterizing unit executed to another kind of rasterizing process which a dynamic reconfigurable processor in one of the remaining rasterizing units is executing, and wherein the step of generating scheduling data corrects the generated scheduling data so as to make rasterizing times in which the rasterizing processes for the plural kinds of attribute data are respectively completed by the plurality of rasterizing units substantially equal to each other.

* * * * *